June 25, 1946.     R. S. OHL     2,402,662
LIGHT-SENSITIVE ELECTRIC DEVICE
Filed May 27, 1941     5 Sheets-Sheet 1
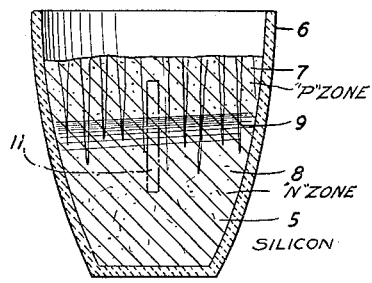
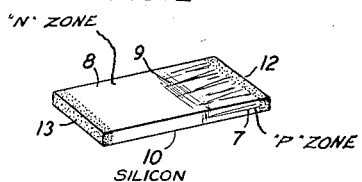
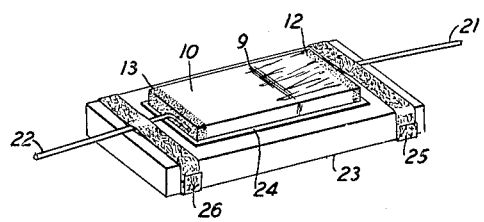
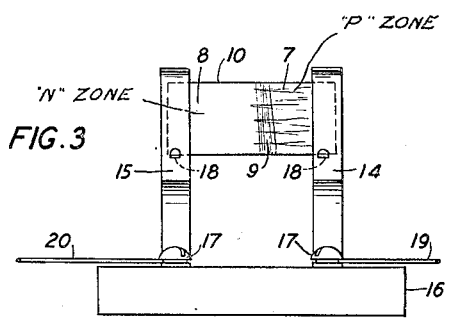
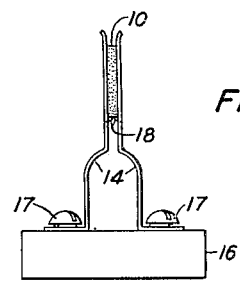
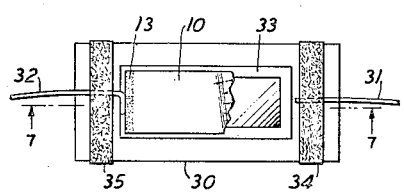
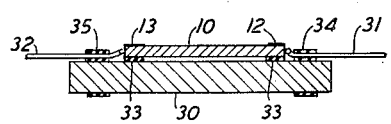
INVENTOR
R. S. OHL
BY
Stanley B. Kent
ATTORNEY June 25, 1946.　　　　R. S. OHL　　　　2,402,662
LIGHT-SENSITIVE ELECTRIC DEVICE
Filed May 27, 1941　　　5 Sheets-Sheet 2
FIG. 8
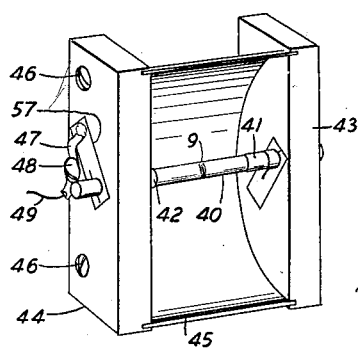
FIG. 9
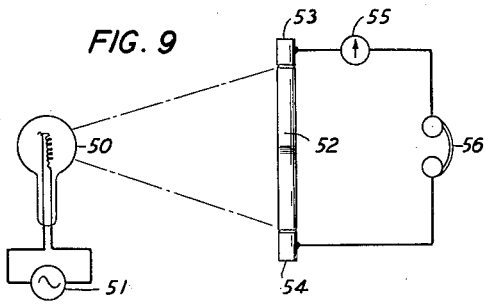
FIG. 10
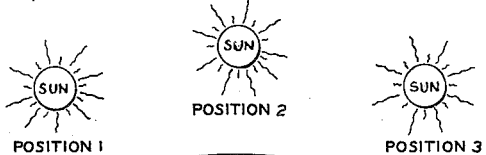
FIG. 11
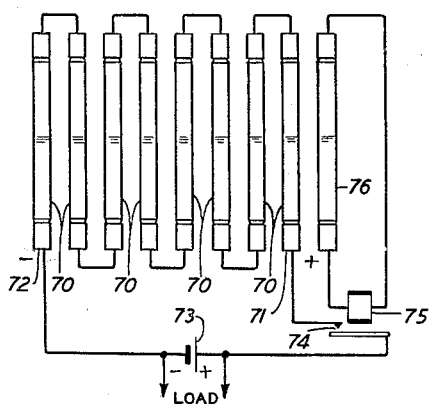
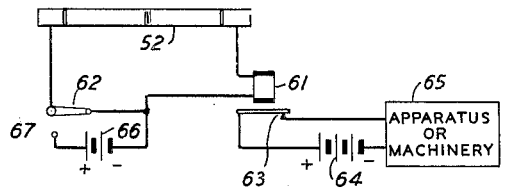
FIG. 12
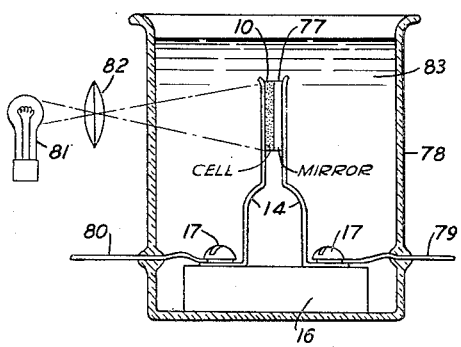
FIG. 13
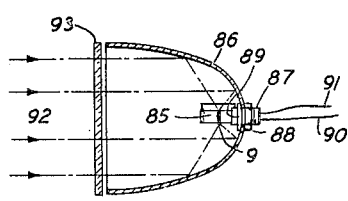
FIG. 13A
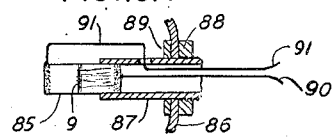
INVENTOR
R. S. OHL
BY
*Stanley B. Kent*
ATTORNEY June 25, 1946.    R. S. OHL    2,402,662
LIGHT-SENSITIVE ELECTRIC DEVICE
Filed May 27, 1941    5 Sheets-Sheet 3

FIG. 14

```
99% SI IN SILICA CRUCIBLE IN ELECTRIC FURNACE
IN VACUUM OR HELIUM ATMOSPHERE

HEAT SLOWLY TO SOME POINT (e.g. 1600°C) ABOVE THE
FUSION POINT WHICH IS APPROXIMATELY 1400°C

COOL TO PERMIT SOLIDIFICATION AT ABOUT 1410°C AND
DOWN TO 1100-1200°C AT 60C° PER MIN.

COOL TO ROOM TEMPERATURE AT 120-130C° PER MINUTE

CUT FROM INGOT A SLAB CONTAINING COLUMNAR
AND NON COLUMNAR ZONES WITH AN INTERVENING
BARRIER BISECTING THE SLAB

GRIND TWO SURFACES OF SLAB PARALLEL TO THE BARRIER
USING 600 MESH DIAMOND WHEEL & WATER LUBRICANT

ETCH THE SURFACES IN HOT SODIUM HYDROXIDE

WASH SURFACES WITH DISTILLED WATER

ELECTROPLATE SURFACES PARALLEL TO BARRIER
WITH RHODIUM FROM A HOT SOLUTION OF RHODIUM TRIPHOSPHATE
SLIGHTLY ACIDIFIED WITH PHOSPHORIC ACID OR SULPHURIC ACID

WASH AND DRY THE RHODIUM PLATING

TIN RHODIUM PLATING (AT LOW TEMPERATURE) WITH
ORDINARY LEAD TIN SOLDER USING AN ACIDIFIED ZINC CHLORIDE FLUX

PLACE "TINNED" ELECTRIC TERMINAL ELEMENTS WITH
FLAT SURFACES IN CONTACT WITH TINNED RHODIUM SURFACES
AND HEAT JOINT UNTIL SOLDER FLOWS
```

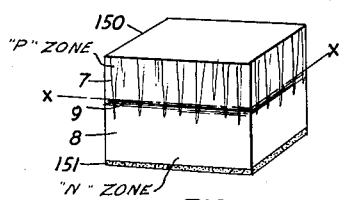
FIG. 26

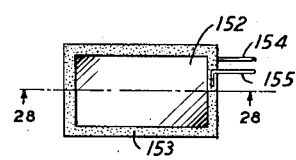
FIG. 27

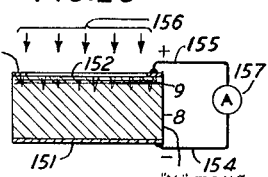
FIG. 28

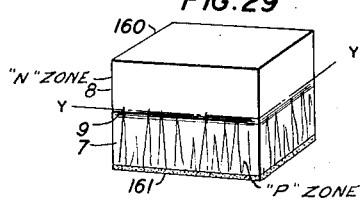
FIG. 29

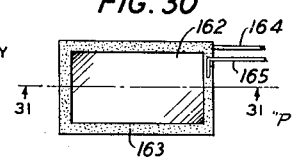
FIG. 30

FIG. 31

INVENTOR
R. S. OHL
BY
Stanley B. Kent
ATTORNEY

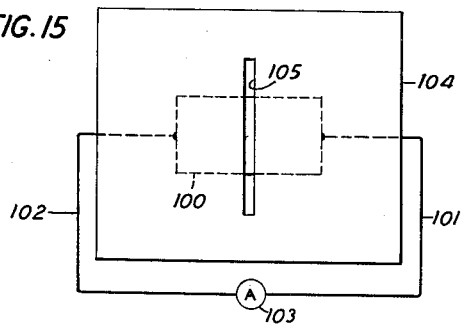
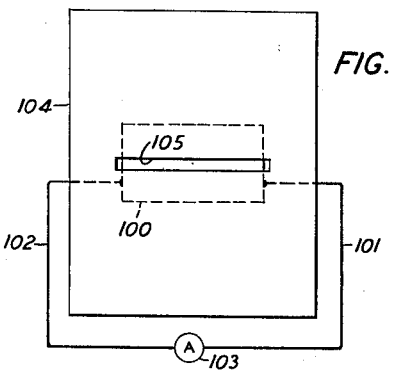
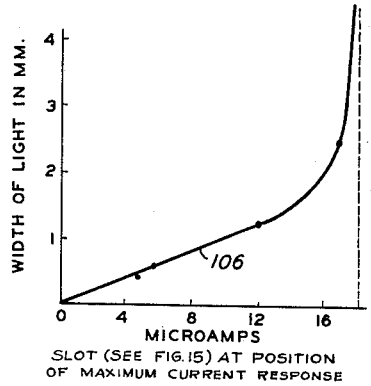
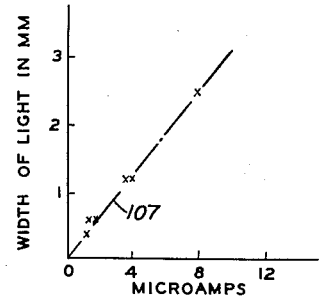
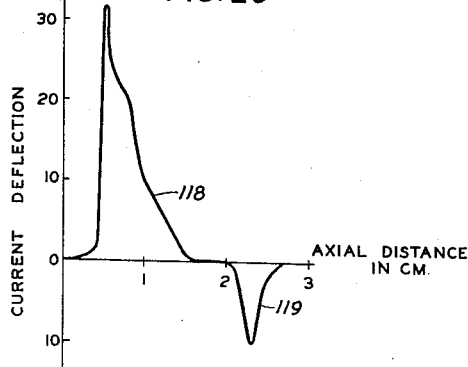
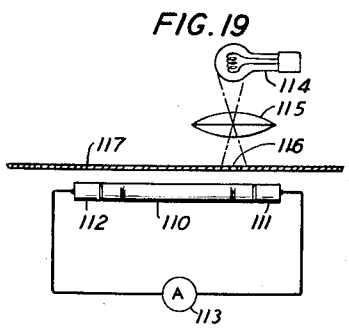

Patented June 25, 1946

2,402,662

UNITED STATES PATENT OFFICE 2,402,662

LIGHT-SENSITIVE ELECTRIC DEVICE

Russell S. Ohl, Little Silver, N. J., assignor to Bell Telephone Laboratories, Incorporated, New York, N. Y., a corporation of New York Application May 27, 1941, Serial No. 395,410

24 Claims. (Cl. 136—89)

This invention relates to light-sensitive electric devices and more particularly to photo-E. M. F. cells comprising fused silicon of high purity.

An object of the invention is to provide an improved light-sensitive electric device.

Another object of the invention is to provide an improved method of making light-sensitive electric devices of fused silicon of high purity.

In an example of practice illustrative of this invention, a photo-E. M. F. cell is formed of a portion of a silicon ingot which is provided with conductive terminals. The ingot is produced by fusing metallic silicon in powdered form in a silica ($SiO_2$) crucible in an electric furnace and slowly cooling the fused material until it solidifies and for a period of time thereafter. The powdered metallic silicon used is of a high degree of purity, say 99 per cent or higher. Certain material which has proved very satisfactory has a purity of approximately 99.85 per cent. Ingots which are suitable for the production of photo-E. M. F. cells possess a characteristic structure which is visible when the surface is suitably prepared in vertical section. The upper portion of the ingot exhibits a columnar crystalline structure while the lower portion is non-columnar, and across the ingot in the lower section of the columnar portion is a striated zone, the striations extending across the ingot. This striated zone has the characteristics of a barrier zone or barrier layer and is conveniently designated simply a so-called "barrier." The portion of the ingot suitable for photo-E. M. F. cells includes this barrier. A slab, square rod or cylinder of material is cut from this portion of the ingot so that the striated or barrier zone lies approximately midway between the ends. Low resistance conductive terminals are secured to these ends on opposite sides of the barrier by plating the ends with rhodium. Circuit connections may be made to the terminals either by friction contacts or by soldering.

The invention will now be described more in detail having reference to the accompanying drawings.

Fig. 1 shows in cross section an ingot of fused silicon within a silica crucible from which ingot photo-E. M. F. cells may be cut;

Fig. 2 illustrates a photo-E. M. F. cell embodying this invention;

Figs. 3 and 4 show the cell of Fig. 2 in one form of mounting;

Fig. 5 shows the cell of Fig. 2 in a modified form of mounting;

Figs. 6 and 7 illustrate another form of mounting wherein a reflecting surface is employed;

Figure 21:
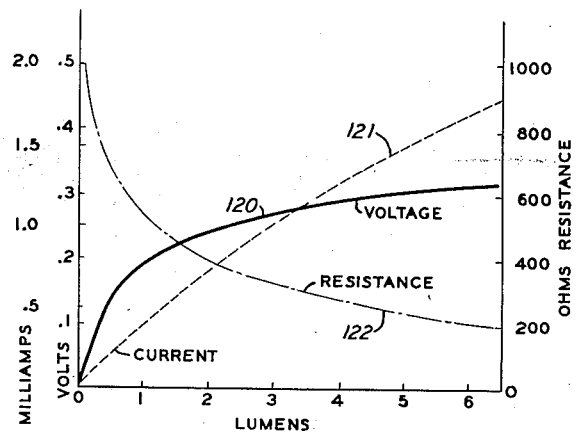
Figure 22:
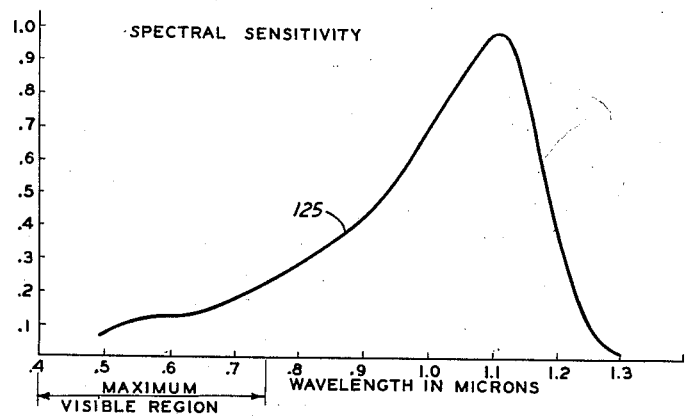
Figure 23:
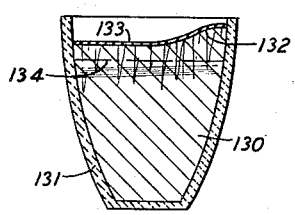
Figure 24:
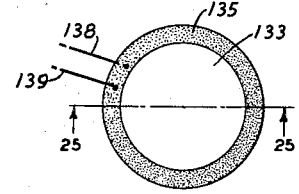
Figure 25:
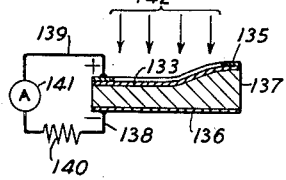

Fig. 8 shows a mounting for a cylindrical type of photo-E. M. F. cell;

Figs. 9, 10 and 11 show circuit arrangements of various kinds which embody photo-E. M. F. cells of this invention;

Fig. 12 shows a photo-E. M. F. unit mounted in a tank of distilled water and backed by a glass mirror;

Fig. 13 illustrates an infra-red exposure meter;

Fig. 13A shows a detail of Fig. 13 partly in cross section;

Fig. 14 is an operational diagram of one form of the method employed for producing photo-E. M. F. cells in accordance with this invention;

Fig. 15 is a diagrammatic showing of a test arrangement for determining the longitudinal distribution of the sensitivity of a photo-E. M. F. cell;

Fig. 16 is a plot of data obtained with the arrangement of Fig. 15;

Fig. 17 is an arrangement, similar to Fig. 15, for determining the transverse distribution of the sensitivity;

Fig. 18 is a plot of data obtained with the arrangement of Fig. 17;

Fig. 19 shows diagrammatically a test arrangement for determining the axial distribution of the sensitivity of a cylindrical section cut from an ingot having two barriers;

Fig. 20 is a plot of data obtained with the arrangement of Fig. 19;

Fig. 21 are plots of current, voltage and resistance, respectively, versus lumens of a typical photo-E. M. F. cell embodying this invention;

Fig. 22 is a plot of the spectral response of another typical photo-E. M. F. cell embodying this invention;

Fig. 23 shows in cross section an ingot of fused silicon within a silica crucible in which ingot the top surface is electrically light sensitive;

Figs. 24 and 25 illustrate a form of photo-E. M. F. cell cut from the upper portion of the ingot of Fig. 23;

Figs. 26, 27 and 28 illustrate a modified photo-E. M. F. cell according to this invention in the fabrication of which the columnar material above the barrier and a small amount of light sensitive barrier material is removed; and Figs. 29, 30 and 31 illustrate still another modification according to this invention in the fabrication of which the material on the non-columnar side of the barrier and some of the barrier material is removed.

Like elements in the several figures of the drawings are indicated by identical reference characters.

During an investigation of the production of fused silicon of high purity and its use for point contact rectifiers applicant discovered that under certain conditions this material was sensitive to visible light, generating an electromotive force independently of any applied voltage. The light-sensitive effects were of a magnitude comparable to the most effective photoelectric substances then known.

The manner of the discovery was briefly as follows:

A considerable number of melts of pure silicon had been made up in connection with the above-mentioned investigation. The material for some of these melts had been heated in a dry helium atmosphere. From each of a plurality of ingots resulting from some of these melts in helium a cylindrical rod had been cut for the purpose of making specific resistance measurements. These rods were about ¾ inch long and ⅛ inch diameter. The rod from one of these melts had been equipped with metal end-pieces by a rhodium plating and lead-tin soldering process hereinafter to be described, to provide a good connection for the specific resistance measurements. Such a measurement was being made on this rod by applicant when he noticed, while viewing on an oscilloscope the wave shape of the 60-cycle current flowing through the rod, that the current in one direction was affected by light from an ordinary 40-watt desk lamp. A battery was then substituted for the 60-cycle current source and a rotating shutter was held between the rod and lamp to produce 20-cycle interruptions. A substantially square-top wave form was seen by applicant in the oscilloscope. Upon reduction and, finally, the elimination of battery voltage the square-top form persisted, although at a reduced amplitude.

This entirely unexpected phenomenon was recognized as of possibly great importance in the art of light-sensitive electric devices and further study of this phenomenon was undertaken forthwith. The outcome of such study is that improved light-sensitive electric devices and particularly photo-E. M. F. cells of high sensitivity and great stability have been made available. The present invention is a result of the above-mentioned discovery.

A form of ingot from which photo-E. M. F. cells can be cut is shown in Fig. 1. The ingot 5 is formed by the solidification of fused silicon in a silica crucible 6. Such an ingot made from certain kinds of highly purified silicon powder in a manner hereinafter to be described, comprises two zones of visibly different structure. The upper zone 7 has a columnar structure, the columnar grains being of the order of one-half millimeter in width and extending down from the top of the ingot to a distance of 5 or 10 millimeters. The lower zone 8 has a non-columnar structure. The ingot fractures most easily in the lengthwise direction of the columns. The columnar portion of the fracture appears lustrous while the non-columnar portion has the appearance of a grayish mass of smaller crystals. Across the lower portion of the columnar zone 7 some sort of boundary or barrier 9 is found. In this region 9 the columnar portion tends to be striated, the striations extending across as well as between the columns. These striations appear, under a microscope, to have discontinuities at the columnar boundaries.

The above-mentioned barrier 9 is apparently the seat of the photo-E. M. F. effect. The upper zone 7 of the ingot 5 develops, on exposure to light, a positive potential with respect to the lower zone 8.

The photo-E. M. F. device of Figure 2 comprises a silicon slab 10 cut from the ingot 5 of Fig. 1 at the position indicated by the dot and dash rectangle 11. This rectangle 11 outlines the section of the slab 10 midway between the edges and parallel thereto. In other words, the slab 10 is so cut from the ingot 5 that the barrier 9 lies approximately midway between the ends of the slab.

The slab 10 may be cut from the ingot 5 by any suitable process, but preferably by a process which conserves as much useful material as possible. The uppermost and lowermost portions of the ingot may be used for other purposes, such as contact rectifiers. The intermediate portion, including the barrier 9, may be used for photo-E. M. F. cells. A metal wheel charged with diamond particles is suitable for cutting the ingot 5, a stream of distilled water being used to clear the cut particles from the kerf and to cool the surfaces.

The surfaces of the slab 10 wherein the outcropping of the barrier 9 occurs, may be used in the condition in which they are cut from the ingot 5. There is an advantage, however, in polishing these surfaces in order to facilitate transmission of the exciting light into the interior of the slab 10. These surfaces may advantageously be polished in many ways. One method which has been used is as follows: The surface was first roughed flat with 600 mesh aloxite, or M–302 optical powder, using an iron lap followed by 1,000 mesh aloxite, and a lead lap in the subsequent polishing with an optical powder such as for instance No. 95 optical powder. Suitable polishing abrasives are obtainable from the Norton Company, the American Optical Company or the Carborundum Company.

In order to facilitate the use of the slab 10 as a photo-E. M. F. cell, contact terminals 12 and 13 are provided on the ends of the slab by a process of rhodium plating. In a rhodium plating process which has been found to be very satisfactory, the end surfaces of the slab are ground flat using a 600 mesh diamond wheel and water lubrication. Thereafter the end surfaces, including small adjoining portions of the side and edge surfaces, are etched in hot sodium hydroxide solution and washed in distilled water. These etched surfaces are thereupon electroplated with rhodium from a hot solution of rhodium triphosphate slightly acidified with phosphoric acid or sulphuric acid. After washing and drying, the rhodium plating makes excellent contact terminals because it does not loosen from the silicon and is highly resistant to corrosion. Such contacts are remarkably free from noise when used in communication circuits, such as are used to convey sound currents.

The size of the photo-E. M. F. cell or unit 10 of Fig. 2 is not critical, but it has been found that advantageous dimensions are 11 millimeters for length, 5 millimeters for width, and 0.6 millimeter for thickness. The barrier 9 lies advantageously about midway between the terminals 12 and 13.

One arrangement for mounting the photo-E. M. F. cell of Fig. 2 is illustrated in Figs. 3 and 4.

Two pairs of spring clips 14 and 15 are secured to a block of insulation 16 by machine screws 17. The photo-E. M. F. cell 10 is slipped between the springs of the pairs of spring clips 14 and 15 with the contact terminals 12 and 13 in contact with the springs. Punched lips 18 prevent the photo-E. M. F. cell 10 from sliding down too far. Conductors 19 and 20 are connected to clips 14 and 15, respectively. When the barrier 9 of the photo-E. M. F. cell 10 is irradiated, a positive potential is developed in conductor 19 with respect to conductor 20 providing that the columnar end of the unit is in contact with clip 14, as shown.

Another arrangement for mounting the unit 10 such as illustrated in Fig. 2, is shown in Fig. 5. The unit 10 is provided with terminal conductors 21 and 22 by soldering. In soldering, the rhodium end surfaces 12 and 13 are tinned with ordinary lead-tin solder using an acidified zinc chloride flux. The solder must not be heated much above its melting point or there is danger of the rhodium being completely dissolved. The ends of the conductors 21 and 22 are freely tinned, then placed in contact with the respective tinned rhodium surfaces and the joint heated until the solder flows, the excess solder being squeezed from between the conductor and the rhodium plating. A strong bond results. The unit 10 with the conductors 21 and 22 is then insulatingly mounted on a copper block 23. "Victron" or other suitable lacquer is used to secure the unit 10 to the block 23 with a sheet of insulation 24, such as a sheet of cigarette paper, between the unit 10 and the block 23. The conductors 21 and 22 are advantageously held out of contact with the copper block 23 by wrappings 25 and 26, respectively, of friction or rubber tape.

Still another arrangement for mounting the unit 10 of Fig. 2 is illustrated in Figs. 6 and 7 which is adapted to make use of reflected light. The unit 10 is provided with conductors 31 and 32 in the manner described in connection with Fig. 5. The polished faces of the unit 10 are treated to reduce the surface reflection losses by the application of approximately a quarter wavelength thickness of "Victron" lacquer. Two dippings of the polished silicon surfaces in "Victron" lacquer is highly beneficial in improving the response of these photo-E. M. F. cells to light. The coated unit 10 is insulatingly mounted on a copper block 30, the surface of the block adjacent to the unit having been highly polished and advantageously treated to render it highly reflective of the radiation used for energizing the photo-E. M. F. cell. The unit 10 is supported at its edges by a hollow rectangle 33, cut from an insulating sheet, such as a sheet of cigarette paper. The slab 10, rectangle 33 and block 30 are cemented together by "Victron" lacquer or other suitable cement, and the conductors 31 and 32 are held out of contact with the copper block 30 by wrappings 34 and 35, similar to those described in connection with Fig. 5.

A modified form of silicon photo-E. M. F. cell is illustrated in Fig. 8. The photo-E. M. F. unit 40 is a cylindrical rod cut from an ingot, such as ingot 5 in Fig. 1, so that the barrier 9 lies approximately midway between the ends of the rod. The ends of the rod are plated with rhodium by the process hereinbefore described in connection with the plating of the slab 10 of Fig. 2. This unit 40 is supported by cylindrical spring contact clips 41 and 42 which pass through insulating supports 43 and 44, respectively. The supports 43 and 44 are held apart and in parallel alignment by a curved metal plate 45 the curved edges of which are inserted in grooves in the inside faces of supports 43 and 44. The supports 43 and 44 are held firmly against the plate 45 by bolts 46 extending through and between the supports. The concave face of the plate 45 is semicylindrical and specularly reflecting. Contact is made with the clip 42 by brush 57, which is held in place by spring 47 and screw 48. Flexible conductor 49 is soldered to the spring 47. Similar contact is made with clip 41 on support 43. The photo-E. M. F. cell 40 may be effectively illuminated by placing a source of light in front of the concave surface of the plate 45 or by orienting such concave surface toward a source of light.

A silicon photo-E. M. F. cell according to this invention has spectral properties which make it ideal for use with an incandescent light source. A circuit arrangement for using such a cell in this manner is illustrated in Fig. 9. An incandescent light source 50 energized from a 110-volt, 60-cycle source 51 illuminates a photo-E. M. F. cell 52 the contact terminals 53 and 54 of which are connected through an ammeter 55 to a telephone headset 56. The contact terminals 53 and 54 may comprise coin silver, brass, steel or other suitable metal soldered to the rhodium-plated ends of the silicon cylinder 52. The process of plating and soldering is advantageously that described hereinbefore in connection with the soldering of contact wires 21 and 22 to the photo-E. M. F. unit 10 of Fig. 5. The combined impedance of the meter 55 and telephone set 56 may be of the order of 1000 ohms, which does not involve the insulation resistance difficulties found in the use of vacuum photoelectric cells, nor does it require the use of a biasing battery. The arrangement of Fig. 9 may be used for reproducing sound from a motion picture sound record by illuminating the sound track, in well-known manner, by light from a source such as source 50 and directing the light passing through the sound track to the photo-E. M. F. cell 52. Such circuits are remarkably free from noise.

An arrangement using a silicon photo-E. M. F. cell to generate power from sunlight is shown in Fig. 10. These cells are particularly suitable for this purpose because of their spectral properties and because of their great durability and their freedom from moisture deterioration. A silicon photo-E. M. F. cell 52 is placed so that sunlight will strike it, preferably condensed by lens 60 or a reflector, and connected in circuit with a relay 61 and a switch 62. If the sunlight is sufficiently bright, relay 61 is energized and breaks at contact 63 the energizing circuit including battery 64 for the apparatus or machinery 65. Whereas, when the sun is obscured or at night, the relay is deenergized and the contact 63 is closed to cause a lamp, for instance, in an airplane beacon to light, a marine warning signal to be sounded or beacon lights in marine lighthouses to be lit. In this kind of service no power is consumed during sunlight, as the sunlight itself is converted into electrical energy by the photo-E. M. F. cell 52 to keep the relay 61 excited.

While the photo-E. M. F. cell 52 of Fig. 10 converts light energy into electrical energy directly, it can be used in connection with a battery 66 by moving the switch 62 to its lower contact 67. In this alternate arrangement the light is used merely to change the resistance in the circuit. The battery 66 should be so poled as to cause a minimum of current to flow through the silicon unit 52 when it is not illuminated. With such a poling of the battery 66 the maximum change in resistance of the silicon unit 52 takes place when the unit is illuminated. The positive terminal of battery 66 should be connected to the non-columnar terminal of the cell 52.

An arrangement for maintaining a battery in charged condition where sunlight is plentiful is illustrated in Fig. 11. A bank of eight photo-E. M. F. cells 70 are arranged to be energized by sunlight and are connected in series-aiding relationship, that is the columnar zone of each cell is connected to the non-columnar zone of the adjacent cell in the series. Terminal contacts 71 and 72 are connected to the terminals of battery 73, which is to be kept charged, through the contact 74 of a relay 75. The columnar terminal 71, which assumes a positive potential with respect to the non-columnar terminal 72 when the units are illuminated, is connected to the positive terminal of battery 73, while the non-columnar terminal 72 is connected to the negative terminal of battery 73. A similar photo-E. M. F. cell 76 is connected in series with the winding of relay 75. Cell 76 is so mounted as to be illuminated by the same intensity of sunlight as cells 70. The relay 75 is so designed that contact 74 will be closed by energizing current generated in photo-E. M. F. cell 76 when sunlight is intense enough to cause a charging voltage for battery 73 to be produced between the terminals 71 and 72 of the bank of photo-E. M. F. cells 70. The bank of eight cells will develop a potential difference of approximately 2 volts at 2 lumens and a maximum difference of potential of about 2.4 volts. Such an arrangement is useful when direct current in small quantities is required and difficult to obtain, but where sunlight is plentiful.

The silicon photo-E. M. F. cell of this invention has been successfully operated while immersed in distilled water. An arrangement for so operating such cells is illustrated in Fig. 12. A mounting identical with that shown in Figs. 3 and 4 is used. A plane mirror 77 is mounted on one side of the photo-E. M. F. unit 10, which is advantageously composed of a glass plate having the surface remote from the unit 10 silvered and insulated from the clips 14 and 15. The mounted unit 10 is placed in a glass container 78 having conductors 79 and 80 sealed through the side walls and connected to the clips 14 and 15, respectively, by screws 17. Light from lamp 81 is directed by lens 82 through the wall of the container 78 and distilled water 83 to the photo-E. M. F. unit 10. With this arrangement a great intensity of light may be concentrated on the unit 10 without danger of overheating. Immersing in distilled water is also advantageous with the units of Figs. 5, 6 and 7 where the terminal conductors are soldered to the rhodium plating. By limiting the temperature to that of the distilled water danger of melting the solder is obviated. The container 78 may be provided with heat-dissipating means of any well-known type, as, for example, cooling fins, recirculating pipes, or a fan for blowing air upon the container. In lieu of the distilled water a bath of any inert liquid, such as oil, may be used as a cooling agent. The liquid, of course, must be such as to transmit the radiation used for energizing the photo-E. M. F. cell 10.

The cylindrical type of silicon photo-E. M. F. cell, such as the unit 40 of Fig. 8, may be used advantageously for an exposure meter sensitive to infra-red light, as illustrated in Figs. 13 and 13A. A cylindrical rod 85 of silicon having the barrier 9, is mounted within a small parabolic reflector 86 in such a way that the barrier 9 is located at the focal position of the reflector. One end of the cylinder 85 is slipped within and soldered to a supporting metallic tube 87, for example of brass, which passes through a hole in the base of the reflector 86. This tube is secured to the reflector by the nut 88 which clamps the edge of the reflector around the hole between a ring 89 around tube 87 and the nut 88. One terminal conductor 90 is soldered to the rhodium plating of silicon unit 85 within tube 87. The tube 87 is soldered to the silicon unit 85 by the rhodium process described in connection with Fig. 5. The other end of silicon rod 85 is connected to an insulated conductor 91 which passes into and through the tube 87. The connecting wire 91 may be a short length of fine silver wire say #40 B and S gauge or fine enough so that its shadow cast upon the barrier surface is negligible. The energizing radiation is represented by the arrows 92 at the left of Fig. 13. Such a device is useful for infra-red photography in the long wave-length region of 11,000 Angstroms to which photographic plates now available are sensitive. When used to measure infra-red intensity only, a filter should be used such as can be made of a flat optically polished glass disk 93 about 2 millimeters thick of color filter glass #254, as manufactured by the Corning Glass Works, Corning, New York.

An operational diagram for producing a photo-E. M. F. unit according to this invention is shown in Fig. 14. Silicon of a purity in excess of 99 per cent obtainable in granular form is placed in a silica crucible in an electric furnace in vacuum or helium atmosphere. Because of a tendency to evolution of gas with violent turbulence of the material, it is desirable to raise the temperature to the melting point by heating the charge slowly. Silicon will be found to fuse at a temperature of the order of 1400 to 1410° C.

In order to facilitate the heating process the silica crucible containing silicon may be placed within a graphite crucible which lends itself to development of heat under the influence of the high frequency field of the electric furnace to a much greater degree than does the silica crucible or its charge of silicon. Care must be taken, however, to avoid exposure of the melted silicon to graphite, oxygen or other materials with which it reacts vigorously. In this manner, the melt may be brought to a temperature of the order of 200° C. above melting point. In an example of practice of this process "high form" crucibles of 50 cubic centimeter capacity obtainable from Thermal Syndicate, Ltd., 12 East 46th Street, New York, New York, were employed. A furnace power input of 7.5 to 10 kilowatts was employed, the required time for melting being of the order of ten to twenty minutes, depending upon the power. The power was then reduced in steps and the temperature of the melted silicon dropped rapidly to the freezing point approximately six or seven minutes being required for the melt to solidify. The solid metal was then permitted to cool towards room temperature at the rate of 60 centigrade degrees per minute, this being effected by decreasing the power input at the rate of about one-half kilowatt per minute. When the temperature had been reduced to the order of 1150 to 1200° C., the power was shut off and the temperature then fell at the rate of about 130 centigrade degrees per minute.

In cooling there is a tendency after the upper surface has solidified for extrusion of metal to occur through this surface during the solidification of the remaining material. Upon examination of the cooled ingot it is found that a portion of the grain structure is columnar, as hereinbefore explained. This is, in general, the upper portion of the ingot or the first material to solidify. In the area last to solidify and beyond the columnar grains a non-columnar structure occurs. Between the zone first to cool and that last to cool there is found to be some sort of a boundary or "barrier" which occurs in a plane normal to the columns and this barrier has extremely important light sensitive electric properties. The barrier ordinarily occurs a short distance above where the columnar and non-columnar zones merge so that it extends across the columns near their lower ends. The region above the barrier develops a positive thermoelectric potential with respect to an attached copper electrode and may, therefore, be designated as the "P" zone. The region below the barrier develops a negative thermoelectric potential with respect to an attached copper electrode. It will be designated as the "N" zone.

To prepare a photo-E. M. F. cell, a slab of material is cut from the ingot in such a manner as to be bisected approximately by the barrier. The surfaces of the slab parallel to the barrier may be ground flat and electric terminal elements attached thereto in the manner diagrammed in Fig. 14 and described hereinbefore.

Granulated silicon of high purity now available on the market is produced by crushing material found in a large commercial melt. That supplied by Electrometallurgical Company, 30 East 42d Street, New York, New York, is of a size to pass a 30 mesh screen and to be retained by an 80 mesh screen. The crushed material is purified by treatment with acids until it has attained a purity considerably in excess of 99 per cent. The chemical composition of a typical sample of this material is approximately:

| | | | |
|---|---|---|---|
| Si | 99.85 | O | .061 |
| C | .019 | H | .001 |
| Fe | .031 | Mg | .007 |
| Al | .020 | P | .011 |
| Ca | .003 | Mn | .002 |
| N | .008 | | |

In some samples amounts up to .03 Ti and .004 Cr have been found.

The results of measurements made in circuits comprising typical photo-E. M. F. cells of this invention will now be given to assist in the understanding of the invention. It is to be understood that these results are actual results obtained with certain specified photo-E. M. F. units. The invention has been embodied in many other units and may find embodiment in many different forms.

Fig. 15 illustrates a test arrangement for determining the location and size of the photo-E. M. F. region in a rectangular slab of silicon cut from an ingot in such a manner that the barrier approximately bisects the slab intermediate the ends thereof. It was a simple matter to determine that the sensitive region was a strip across the face of the slab, probably only a few millimeters wide. This was done by moving a light spot over the face of the slab while the terminals were connected to a milliammeter and noting the positions of the spot for maximum current at a plurality of transverse positions. In order to determine the actual dimensions of the sensitive region pieces of opaque black paper were slotted with variable width slots and slid over the surface of the slab until a maximum response was obtained for a given intensity of illumination of the area exposed by the slot. One such piece of paper is illustrated in Fig. 15. The slab 100 provided with rhodium-plated soldered wire terminals 101 and 102 is connected to a microammeter 103. A sheet of black paper 104 covers the slab except for the surface exposed by slot 105 which lies transversely across the slab 100. In order to find the position of maximum current response with a given width of slot 105 and given intensity of illumination of the surface of the slab exposed by the slot, the surface of the slab is explored by moving the paper 104 with the slot 105 lengthwise across the slab. For each width of slot the response would vary as typified by the graph of Fig. 20, but the response graph would differ from the specific shape there shown, dependent upon the location of the barrier and the width of the slot. With a certain slab-type of photo-E. M. F. cell, mounted as shown in Fig. 5, which is 11.4 millimeters long, 5.5 millimeters wide and 0.6 millimeter thick, the data of Fig. 16 was obtained. The slot width is plotted as ordinates and the current at the position of maximum response as abscissae. The curve 106 shows that the response is linear for small slot widths up to about 1.5 millimeters, but that beyond this width there is a relatively small increase of response current from 14 microamperes to 18 microamperes for the whole length of the slab which, as mentioned above, was 11.4 millimeters. Therefore, it can be said that for this particular slab a strip of illumination about 1.5 millimeters wide across the slab yields very nearly the total response for a given light flux intensity.

Fig. 17 shows a test arrangement much like that of Fig. 15 but adapted to determine any variation of the photo-E. M. F. region transversely of the slab. The black paper 104 with the slot 105 is rotated 90 degrees with respect to its position in Fig. 15. The data of Fig. 18 was obtained with various slot widths oriented as in Fig. 17 and with the photo-E. M. F. cell described hereinbefore as being 11.4 millimeters long, 5.5 millimeters wide and 0.6 millimeter thick. At the position of maximum response for each slot width, the response is proportional to the width of the light band as shown by curve 107 of Fig. 18. This shows that there is negligible variation in the photo-E. M. F. region transversely of this slab.

It has happened that an ingot was formed with a double barrier one of which was near the top of the ingot and the other near the bottom. A photo-E. M. F. cell cut from such an ingot and including both barriers exhibits a double peaked response when explored with a narrow light spot. A test arrangement for determining such response is shown in Fig. 19. Such a photo-E. M. F. cell 110, provided with metal terminals 111 and 112, is connected to an ammeter 113. A small transverse strip of the cell is illuminated by light from a source 114 directed by lens 115 through an aperture 116 in a sheet of black paper 117. The cell 110 is moved lengthwise in front of the aperture 116 and the current deflection in the meter 113 is observed. With a certain rod-type of photo-E. M. F. cell, designated rod No. 2, which is 3.15 millimeters in diameter, 30 millimeters long and 24 millimeters between the plated terminals, the data of Fig. 20 was obtained. The width of the light beam was approximately one-half millimeter and its wave-length was 1.1 microns. The current deflection is plotted as ordinates and the distance from one selected end in centimeters is plotted as abscissae. As shown by curves 118 and 119, this photo-E. M. F. cell exhibits two maxima of current response which are of opposite polarity. If both barriers are illuminated simultaneously the effects are opposing in the series circuit including the meter 113. In this particular rod, one barrier is more responsive than the other, as indicated by the height of the peaks of curves 118 and 119. The width of the areas under response curves 118 and 119 is probably due to the fact that the pure silicon of these units is appreciably light transmissive.

The illumination-response characteristics of the photo-E. M. F. cell described in connection with Figs. 15 to 18 as being 11.4 millimeters long, 5.5 millimeters wide and 0.6 millimeter thick, are shown by the curves of Fig. 21. The light source used to obtain this data was a 21-candlepower 6 to 8-volt automobile lamp No. 1130 operated at 7.40 volts and a color temperature of 2930° K. The filament was focused in a spot at the barrier at a magnification of about unity. The flux in this beam was varied by inserting Levy line screens whose transmission was determined in the position used. Curve 120 shows the open-circuit voltage and curve 121 shows the short-circuit current dependence on incident light flux in lumens. The voltage is expressed in volts and the current in milliamperes. Curve 122 shows the value of resistance at which the short-circuit current was reduced to one-half.

The spectral sensitivity of a cylindrical type of single-barrier photo-E. M. F. cell is shown in Fig. 22. This cell is 3.15 millimeters in diameter, 26 millimeters long and 21 millimeters between the terminal platings. Curve 125 shows the spectral sensitivity. The ordinates are equi-energy values, the maximum being unity. The abscissae are wave-lengths of the light in microns. The measurements were made using a small spot of light from the spectrometer focused on the barrier. It will be noted that, while the cell has some sensitivity in the visible region, the maximum is out in the infra-red. Since the light penetrates an appreciable thickness of silicon to reach portions of the barrier, the optical transmission of the silicon has an effect on the shape of curve 125. Because of this large response in the deep infra-red, the silicon photo-E. M. F. cells of this invention provide a tool not available heretofore in the optical art.

If one is given a chunk of material known to have photo-E. M. F. properties and wishes to prepare it for use, say to demodulate light beams modulated at speech frequencies, the questions of shape, size, etc., immediately arise. In the case of metallic silicon the fabrication methods influence the answers considerably. It is not particularly difficult to cut either parallelepipeds or cylindrical rods from the solid material. Of the two shapes, the rods are the more difficult to fabricate, there is considerable waste of material and they have a higher barrier capacity for a given size of illuminated surface. Therefore, it is advantageous to make the more highly developed cells in the form of rectangular parallelepipeds.

The first parallelepipeds were cut about 3 millimeters thick, 8 millimeters wide and 12 millimeters long. These units gave a good photo-E. M. F. response as light indicating devices, but when they were used as light modulation detectors, the response to high frequencies was very poor. This lack of high frequency response was due to the capacity across the barrier. This effect is especially serious when the light intensity is low. Thinner slabs greatly improve the high frequency response in spite of a reduced current output. The over-all performance was noticeably decreased when the slabs were made thinner than about one-half millimeter. The least important dimensions, namely the width and length of the cell, appear to be determined by the impedance of the circuit into which they would be required to work and the size of the light source as well as other less important physical considerations. The most critical dimension is the thickness.

Below are tabulated relative sensitivity values of a number of thin slabs of silicon which were mounted on brass in a manner suitable for test with speech frequency modulated light. The currents were measured with a 50-ohm meter.

| Sample No. | Length | Width | Thickness | Microamp. | Approx. active area | Microamp. per sq. mm. |
|---|---|---|---|---|---|---|
| | Mm. | Mm. | Mm. | | Sq. mm. | |
| C1 | 7.9 | 4.4 | .50 | 9 | 6.6 | 1.35 |
| C2 | 7.8 | 4.2 | .30 | 6 | 6.3 | .95 |
| C3 | 8.6 | 4.5 | .30 | 7 | 6.7 | 1.04 |
| C4 | 8.5 | 4.1 | .50 | 18 | 6.2 | 2.9 |
| C5 | 7.1 | 7.1 | .25 | 8 | 6.4 | 1.25 |
| D1 | 12 | 5 | .64 | 22.5 | 7.5 | 3.0 |

Sample No. D-1 was treated with "Victron" lacquer to reduce surface reflection and mounted on a polished metal plate in a manner hereinbefore described.

The above data show that the thinner plates are somewhat less responsive to a given illumination per unit area than the thicker ones. It is physically difficult to cut the very thin plates and as there seems to be no particular advantage in doing so, it is probably satisfactory to cut the units with a thickness of about one-half millimeter.

During the production of silicon ingots according to the method hereinbefore described it was discovered that in a small proportion of the melts, say 3 to 5 per cent, the top of the melt was covered with material which was extruded from the interior during the cooling process. The top surfaces of some such ingots had a pale yellowish and greenish fluorescent appearance. It was discovered by applicant that if a contact were made to the top surface of such an ingot and some other point of the ingot, an electric current would flow if the top of the ingot were irradiated with infra-red or visible light. The electrons are apparently very efficiently released by the light and driven into the main conducting body of purified silicon. Substantially the full sensitivity is developed whatever may be the size of the surface contact area. This type of photo-E. M. F. cell shows some response for ultra-violet radiation.

An ingot which shows extruded material and the above-mentioned surface layer is shown in vertical section in Fig. 23. The ingot 130 is formed by the solidification of fused silicon powder of high purity in a silica crucible 131. The extruded material forms a hump 132 in the upper surface of the ingot, while the whole surface is covered by the active layer 133. The thickness of this layer 133 is necessarily greatly exaggerated in Fig. 23. It is in fact of microscopic thickness.

A photo-E. M. F. cell comprising this sensitive layer 133 may be fabricated by slicing off the top of ingot 130 at the position shown by dot and dash line 134, and adding contact terminals as shown in Figs. 24 and 25. An advantageous form of contact for the sensitive surface layer comprises a ring of sputtered platinum 135. Another way to form a contact ring is to use platinum paint and heat or "fire" the unit at a temperature of 500° to 550° C. The sensitive surface layer is not injured by such firing operation. The other contact 136 attached to the body of silicon 137 may be formed as hereinbefore described by electroplating with rhodium to which a copper wire 138 may be soldered. Similarly another copper wire 139 may be soldered to the platinum ring 135. This photo-E. M. F. cell may be connected to a load circuit 140 in series with ammeter 141 by means of conductors 138 and 139. The illumination of the light sensitive layer is indicated by the arrows 142. The whole unit may be dipped in "Victron" or other suitable lacquer. The thickness of the lacquer on the sensitive layer may advantageously be made one-fourth the wave-length of the energizing radiation. Such a thickness reduces reflection.

Another form of photo-E. M. F. cell according to this invention in which the surface of the barrier is illuminated, is illustrated in Figs. 26, 27 and 28. Fig. 28 is a cross section through the cell of Fig. 27 at the plane indicated by the arrows 28. In fabricating one form of such a cell, the columnar zone of a body of fused silicon is cut away down to the barrier, terminal contacts being made to the resulting exposed surface of the barrier zone and the opposite surface of the non-columnar zone. As shown in Fig. 26, a block of silicon 150 in the form of a parallelepiped is cut from a silicon ingot such as that shown in Fig. 1, having a barrier zone 9 substantially parallel to the top and bottom faces of the block. The columnar zone 7 is at the top and the non-columnar zone 8 at the bottom. The lower surface of the non-columnar zone 8 is provided with an electrical contact 151 by plating with rhodium in the manner hereinbefore described. The upper portion of the columnar zone 7 is then cut away down to the plane represented by the line X—X. This plane extends through the upper layer of the barrier zone, the location of which zone is determined by exploring the vertical surfaces of the block 150 with a small spot of light and noting the current response in a test circuit connected to the upper and lower surfaces of the block 150. The resulting barrier surface 152 is then highly polished and a narrow strip around the periphery of the polished surface is roughened with M-302 emery. Both the polished and roughened portions of surface 152 are then plated with rhodium in the manner hereinbefore described. The rhodium plating is then rubbed off from the polished portion of the surface 152 leaving a strip of plating 153 around the periphery. This strip 153 serves as an electrical contact for the barrier region of the resulting photo-E. M. F. cell. Conductors 154 and 155 may be soldered to the rhodium contacts in the manner hereinbefore described. The illumination of the light sensitive surface is indicated by the arrows 156. When illuminated, conductor 155 assumes a positive potential with respect to conductor 154.

Another photo-E. M. F. cell, similar to that just described but in which the non-columnar material 8 is cut away down to the barrier 9, is illustrated in Figs. 29, 30 and 31. Fig. 31 shows a cross section of the cell of Fig. 30 at the plane indicated by arrows 31. In fabricating this form of cell, a block of silicon 160 similar to that of Fig. 26, having a columnar zone 7, a non-columnar zone 8 and a barrier region 9 is cut from an ingot of fused silicon. The bottom surface of the columnar zone 7, the columnar zone being at the bottom in Fig. 29, is provided with an electrical contact 161 by plating with rhodium in the manner hereinbefore described. The non-columnar zone 8 is cut away down to the upper portion of the barrier region represented by the plane indicated by the line Y—Y. The resulting barrier surface 162 is polished, roughened around the periphery and plated with rhodium which is partly removed to form contact 163 as explained in connection with the cell of Figs. 27 and 28. Conductors 164 and 165 are soldered to the rhodium platings 161 and 163, respectively. The polished surface 162 is shown illuminated by light rays 166 passing through 30-degree lenses 167. When illuminated, conductor 164 assumes a positive potential with respect to conductor 165.

The edges of the cells of Figs. 28 and 31 may be provided with an opaque insulating coating, such as black pitch, to exclude extraneous light. The 30-degree lenses of Fig. 31 may also be used with the cell of Fig. 28. The use of such lenses is advantageous when these cells are used as exposure meters.

It has been found that individual photo-E. M. F. cells of the kind illustrated in Figs. 28 and 31 are about equally sensitive over the whole exposed barrier surface as determined by exploring the surfaces of several cells with a small spot of light. It is advantageous to cut close to or even into the barrier region. Measurements made on several cells indicate that there is some advantage in cutting away the columnar region of the silicon block as illustrated in Figs. 26, 27 and 28 instead of the non-columnar region as illustrated in Figs. 29, 30 and 31. The columnar material is more transparent than the non-columnar material and accordingly a somewhat larger proportion of the light can reach the light sensitive region. However, both types of cells are useful. The amount of silicon adjacent to the barrier region on the side opposite to that which is illuminated, in these types of cells appears not to be critical.

An ammeter 157 is shown connected to the conductors 154 and 155 of the photo-E. M. F. cell of Fig. 28 and an ammeter 168 is shown connected to conductors 164 and 165 of the photo-E. M. F. cell of Fig. 31.

A coating of "Victron" or other suitable lacquer may be used on the polished surfaces of the cells of Figs. 28 and 31 to reduce reflection losses.

The nature of the boundary or barrier zone and the reasons for its electrical behavior are obscure. There is evidence to indicate that the phenomena observed are dependent not only upon high purity of the silicon but also upon the character of the extremely small amounts of impurities which remain. In the most satisfactory ingots the "N" zone portions have very tiny gas pockets and upon cutting through this zone a characteristic odor of acetylene is observed. Moreover, certain lots of highly pure silicon which have at first appeared to be defective in barrier-forming properties have been satisfactorily conditioned by the introduction of carbon or silicon carbide into the melt in amounts of the order of 0.1 per cent to 0.5 per cent and this should be done if a preliminary sample of a particular lot of material does not form the distinctive barrier structure.

The slow cooling is an important factor as is readily demonstrated upon microscopic examination of sectioned specimens of silicon ingots which have been etched and stained. The barrier zone is evident as one or more striations of a somewhat different appearing material in consequence of its different reaction to the etching acid. In the case of slow cooling the striation extends across the entire ingot, thus dividing the ingot into discrete "P" and "N" zones. Where, however, the cooling is precipitate as in the case of shutting off the heating power suddenly as soon as fusion occurs and permitting the temperature to fall suddenly, the first spots to cool develop "P" zones and these are surrounded by "N" zone matrices in such irregular fashion as to render the resulting ingot quite unsatisfactory for photo-E. M. F. cells. The slow cooling rate is important in developing an orderly striation or barrier. Features of the method of preparing effective silicon materials are described and claimed in the application of J. H. Scaff, Serial No. 386,835, filed April 4, 1941, for improvements in the Preparation of silicon materials. For further information regarding material from which light sensitive electric devices according to this invention may be fabricated, reference is made to the disclosure of this Scaff application.

"Victron" lacquer, which has been referred to hereinbefore, is a solution of polystyrene with the addition of a small amount of resin to produce a good lacquering result. It is a commercial product.

This application is a continuation in part of application Serial No. 385,425, filed March 27, 1941, for Electrical translating devices utilizing silicon.

Subject matter divided from this application is disclosed and claimed in Application Serial No. 458,709, filed September 17, 1942.

What is claimed is:

1. The method of producing a light sensitive electric device which comprises fusing purified powdered silicon in an inert atmosphere in a silica (SiO₂) crucible, cooling the silicon so as to produce an ingot which includes a light sensitive portion intermediate the top and bottom of the ingot on either side of which portion the ingot is visibly different in structure, cutting a section from said ingot which includes some of said intermediate and adjacent portions, and attaching electrical connections to the portions of said section on opposite sides of said intermediate portion.

2. The method of producing a light sensitive electric device which comprises fusing purified powdered silicon in an atmosphere of helium in a silica (SiO₂) crucible, slowly cooling the silicon so as to produce an ingot which includes a light sensitive portion intermediate the top and bottom of the ingot on either side of which portion the ingot is visibly different in structure, cutting a section from said ingot which includes some of said intermediate and adjacent portions, and attaching electrical connections to the portions of said section on opposite sides of said intermediate portion.

3. A light sensitive electric device comprising a light sensitive body of solidified fused silicon having a zone of columnar structure and a second zone of non-columnar structure, an electrical terminal connected to the columnar zone, and a second electrical terminal connected to the non-columnar zone.

4. A light sensitive electric device comprising a light sensitive body of silicon having a purity of the order of 99 per cent and so formed as to have a zone of columnar structure and a zone of non-columnar structure integrally connected together, an electrical terminal connected to the columnar zone, and a second electrical terminal connected to the non-columnar zone.

5. A light sensitive electric device comprising a light sensitive body of silicon having a purity in excess of 99 per cent and an internal structure comprising two zones of very different formation separated by a barrier formed by the fusion and solidification of said silicon the electrical condition of which is modified by light, and an electrical terminal connected to each zone.

6. A light sensitive electric device comprising a light sensitive integral body of silicon having a purity in excess of 99 per cent, the body having a pair of electrical terminal surfaces adjacent one of which the internal structure of the body is columnar and adjacent the other of which it is non-columnar.

7. A photo-E. M. F. cell comprising a slab of solidified fused silicon having a light sensitive barrier produced by fusing and cooling granulated silicon of a purity in excess of 99 per cent and a polished surface in the region of said barrier, electrical terminals connected to the metallic silicon on opposite sides of said barrier, respectively, and a thin coating of transparent lacquer on said polished surface.

8. A light sensitive electric device comprising solidified fused silicon having a light sensitive barrier produced by fusing and cooling granulated silicon of a purity in excess of 99 per cent and a polished surface in the region of said barrier, electrical terminals connected to the metallic silicon on opposite sides of said barrier, respectively, and a layer of transparent lacquer on said polished surface of thickness one-quarter the wave-length of light to which said layer is sensitized.

9. A photo-E. M. F. cell comprising a slab of solidified fused silicon having a light sensitive barrier produced by fusing and cooling granulated silicon of a purity in excess of 99 per cent and a polished surface in the region of said barrier, electrical terminals connected to the metallic silicon on opposite sides of said barrier, respectively, and a layer of transparent lacquer on said polished surface 0.3 micron thick.

10. A photo-E. M. F. cell comprising a slab of solidified fused silicon having a light sensitive barrier produced by fusing and cooling granulated silicon of a purity in excess of 99 per cent and polished side surfaces, a mounting block having a specular surface, means to maintain one of said polished side surfaces close to said specular surface but out of electrical contact therewith, and electrical contacts connected to the metallic silicon of said slab on opposite sides of said barrier, respectively.

11. A photo-E. M. F. cell comprising a section of fused silicon ingot having a transverse barrier sensitive to light produced by fusing and cooling granulated silicon of a purity in excess of 99 per cent, and individual platings of rhodium intimately joined to the metallic silicon on opposite sides of said barrier, respectively.

12. A photo-E. M. F. cell comprising a section of fused silicon ingot having a transverse barrier sensitive to light produced by fusing and cooling granulated silicon of a purity in excess of 99 per cent, individual platings of rhodium intimately joined to the metallic silicon on opposite sides of said barrier, respectively, and a separate terminal contact attached by lead-tin solder to each of said platings of rhodium.

13. A light sensitive electric device comprising a photo-E. M. F. cell including solidified fused purified silicon having a barrier produced by fusing and cooling granulated silicon of a purity in excess of 99 per cent which barrier is sensitive to light, a liquid container having a light transmitting portion, means to mount said cell within said container with the barrier opposite to said light transmitting portion of said container, and a light transmitting high resistance liquid within said container within which liquid said cell is immersed.

14. A light sensitive electric device comprising a solid body formed by cooling fused silicon having a zone of columnar structure, a zone of non-columnar structure and a zone including striations within the zone of columnar structure near the zone of non-columnar structure which is sensitive to light, said striations being visible on microscopic examination of a suitably etched surface including the three zones and extending transversely to the columnar structure.

15. A photo-E. M. F. cell comprising a solid body formed by cooling fused silicon having a purity in excess of 99 per cent and so formed as to have a "P" zone, an "N" zone and a zone between said "P" zone and "N" zone which is sensitive to light including striations which are visible on microscopic examination of a suitably etched surface extending through said three zones.

16. A photo-E. M. F. cell comprising a right cylinder of solidified fused purified silicon having a barrier sensitive to light and formed by the fusion and solidification of said silicon, and contact terminals connected to the silicon at the respective ends of said cylinder.

17. A photo-E. M. F. cell comprising a plurality of right cylinders of solidified fused silicon each having a barrier sensitive to light and formed by the fusion and solidification of said silicon, and contact terminals connected to the silicon on opposite sides of each barrier, a contact terminal of each cylinder being conductively connected to a contact terminal of another cylinder.

18. A photo-E. M. F. cell comprising a light sensitive body of silicon solidified in two zones of different formations with an integral interposed barrier produced by fusing and cooling granulated silicon of a purity in excess of 99 per cent, rhodium coatings on separated surface portions of said two zones respectively, and elements of a different metal connected by solder to said rhodium coatings respectively.

19. A photo-E. M. F. cell comprising a light sensitive body of silicon solidified in two zones of different formations with an integral interposed barrier produced by fusing and cooling granulated silicon of a purity in excess of 99 per cent, said body being in the form of a right cylinder, rhodium coatings on the ends of said cylinder, and right cylinders of a high conductivity metal soldered to said coatings respectively.

20. A photo-E. M. F. cell comprising a right cylinder of solidified fused purified silicon having a barrier formed by the fusion and solidification of said silicon, and contact terminals connected to the silicon at the respective ends of said cylinder, the barrier having a light responsive characteristic whereby the silicon at one end of the cylinder assumes a potential different from that of the silicon at the other end when the barrier is illuminated.

21. A light sensitive electric device comprising a body of silicon solidified in two zones of different formations with an integrally interposed barrier formed by the fusion and solidification of said silicon, and an electrical terminal electrically connected to each zone, the barrier having a light responsive characteristic whereby the silicon in one of said zones assumes a potential different from that of the silicon in the other of said zones when the carrier is illuminated.

22. A light sensitive electric device comprising a body of solidified fused silicon having a barrier layer formed by the fusion and solidification of said silicon, and conducting means connected to said barrier layer on opposite sides thereof, the barrier layer having a light responsive characteristic whereby the conducting means connected to one side of the barrier layer assumes a potential different from that of the conducting means connected to the other side of the barrier layer when the barrier layer is illuminated.

23. A photo-E. M. F. cell comprising a section of fused silicon ingot having a transverse barrier sensitive to light produced by fusing and cooling granulated silicon of a purity in excess of 99 per cent, and electrical terminals contacting the metallic silicon on opposite sides of said barrier, respectively.

24. A light sensitive electric device comprising a light sensitive solid body formed by cooling fused silicon of a purity in excess of 99 per cent so as to have a light sensitive layer integrally joined to silicon which is relatively insensitive to light.

RUSSELL S. OHL.